United States Patent
Dholakia et al.

(10) Patent No.: US 10,006,811 B2
(45) Date of Patent: Jun. 26, 2018

(54) RANDOM WAVELENGTH METER

(71) Applicant: University Court of the University of St Andrews, St Andrews (GB)

(72) Inventors: Kishan Dholakia, Fife (GB); Michael Mazilu, Fife (GB); Klaus Metzger, Fife (GB)

(73) Assignee: UNIVERSITY COURT OF THE UNIVERSITY OF ST ANDREWS (GB)

( * ) Notice: Subject to any disclaimer, the term of this patent is extended or adjusted under 35 U.S.C. 154(b) by 0 days. days.

(21) Appl. No.: 15/032,563

(22) PCT Filed: Oct. 29, 2014

(86) PCT No.: PCT/GB2014/053218
§ 371 (c)(1),
(2) Date: Apr. 27, 2016

(87) PCT Pub. No.: WO2015/063481
PCT Pub. Date: May 7, 2015

(65) Prior Publication Data
US 2016/0258817 A1 Sep. 8, 2016

(30) Foreign Application Priority Data
Oct. 29, 2013 (GB) .................................. 1319079.8

(51) Int. Cl.
*G01N 21/00* (2006.01)
*G01J 9/02* (2006.01)
*G01J 3/02* (2006.01)
*G01J 4/00* (2006.01)
*G01J 1/42* (2006.01)
*G01J 1/04* (2006.01)

(52) U.S. Cl.
CPC .......... *G01J 9/0246* (2013.01); *G01J 1/4257* (2013.01); *G01J 3/0205* (2013.01); *G01J 4/00* (2013.01); *G01J 2001/0481* (2013.01); *G01J 2009/0257* (2013.01)

(58) Field of Classification Search
CPC ............. G01J 1/4257; G01J 2001/0481; G01J 2009/0257; G01J 3/0205; G01J 4/00; G01J 9/0246
USPC ................................................. 356/337–343
See application file for complete search history.

(56) References Cited

U.S. PATENT DOCUMENTS

| | | | |
|---|---|---|---|
| 5,153,426 A | 10/1992 | Konrad et al. | |
| 6,393,037 B1 | 5/2002 | Basting et al. | |
| 6,795,190 B1 * | 9/2004 | Paul | G01J 3/42 356/437 |
| 7,375,812 B2 * | 5/2008 | Atia | G01J 3/02 356/432 |

(Continued)

OTHER PUBLICATIONS

Redding et al: "Compact spectrometer based on a disordered photonic chip", Nature Photonics, vol. 7, No. 9, Jul. 28, 2013, pp. 746-751.

(Continued)

*Primary Examiner* — Tri T Ton
(74) *Attorney, Agent, or Firm* — Sheridan Ross P.C.

(57) ABSTRACT

An optical system comprising a randomizer that has a plurality of randomly positioned scatterers for scattering and thereby randomizing light to generate a speckle pattern and a detector for detecting the speckle pattern to determine at least one property of the light and/or change in at least one property of the light.

26 Claims, 11 Drawing Sheets

(56) References Cited

U.S. PATENT DOCUMENTS

| | | | |
|---|---|---|---|
| 9,110,006 B1* | 8/2015 | Hovde | G01N 21/255 |
| 2002/0122444 A1 | 9/2002 | Tsai | |
| 2003/0035120 A1 | 2/2003 | Myatt et al. | |
| 2006/0187457 A1* | 8/2006 | Atia | G01J 3/02 356/432 |
| 2008/0123106 A1 | 5/2008 | Zeng et al. | |
| 2008/0231418 A1* | 9/2008 | Ophey | G02B 26/0833 340/5.85 |
| 2009/0009759 A1* | 1/2009 | Backman | A61B 1/00096 356/303 |
| 2013/0015367 A1* | 1/2013 | Cui | G02B 26/06 250/459.1 |

OTHER PUBLICATIONS

International Search Report and Written Opinion prepared by the European Patent Office dated May 6, 2015, for International Application No. PCT/GB2014/053218.

Mazilu et al: "Simultaneous determination of the constituent azimuthal and radial mode indices for light fields possessing orbital angular momentum", Applied Physics Letters, American Institute of Physics, US, vol. 100, No. 23, Jun. 4, 2012, pp. 231115-231115.

Mourka et al. "Modal Characterization using Principal Component Analysis: application to Bessel, higher-order Gaussian beams and their superposition," Scientific Reports, Mar. 2013, vol. 3, 8 pages.

Nixon et al. "Focusing through disordered media inside a laser cavity," Lasers and Electro-Optics (CLEO), 2012 Conference on, IEEE, May 6, 2012, 2 pages.

Park et al. "Active spectral filtering through turbid media," Optics Letters, Aug. 2012, vol. 37, No. 15, pp. 3261-3263.

Redding et al. "All-fiber spectrometer based on speckle pattern reconstruction," Optics Express, Mar. 2013, vol. 21, No. 5, pp. 6584-6600.

Small et al. "Spectral control of broadband light through random media by wavefront shaping," Optics Letters, Aug. 2012, vol. 37, No. 16, pp. 3429-3431.

Extended Search Report for European Patent Application No. 17167609.1, dated Jan. 17, 2018, 14 pages.

* cited by examiner

RANDOM WAVELENGTH METER

CROSS REFERENCE TO RELATED APPLICATIONS

This application is a national stage application under 35 U.S.C. 371 and claims the benefit of PCT Application No. PCT/GB2014/053218 having an international filing date of 29 Oct. 2014, which designated the United States, which PCT application claimed the benefit of Great Britain Application No. 1319079.8 filed 29 Oct. 2013, the entire disclosures of each of which are incorporated herein by reference.

FIELD OF THE INVENTION

The present invention relates to an optical system, such as a wavelength meter, for example a spectrometer or interferometer, and a method for wavelength selection.

BACKGROUND OF THE INVENTION

Light propagation through time dependent disordered or random media is generally regarded as a randomisation process of the optical field destroying all the information in the initial beam. However, a coherent beam propagating in a stationary random medium yields a deterministic speckle pattern, whilst maintaining its initial spatial and temporal coherence. Such behaviour is exploited in the design of several novel optical devices, for example to create focal spots using computer generated holograms, to trap microparticles and coherently address plasmonic nano-structures.

Key to devices based on time dependent disordered or random media is that the information content of the optical field is maintained when transmitted through a random medium. Thus, the stationary wavefront randomisation process can be used to detect the state of the light field before scattering.

The use of wavelength meters is ubiquitous in photonics. Miniaturisation of such devices would be highly advantageous. A multimode fiber may be used to create wavefront randomisation to act as a spectrometer, as described in B. Redding, S. M. Popoff, and H. Cao, Opt. Express 21, 6584 (2013), and B. Redding and H. Cao, Opt. Lett. 37, 3384 (2012). However, to achieve a resolution of 8 pm between two adjacent laser lines would require 20 m of fibre free of perturbations, which would be difficult to realize in practice. It has also separately been recognised that spectral polarimetric measurements may be performed using the transmission matrix of random media, see T. W. Kohlgraf-Owens and A. Dogariu, Opt. Lett. 35, 2236 (2010).

Lab-on-a-chip applications require small integrated wavelength detectors. One way to achieve this is by propagating light through periodic structures, such as a super prism made from specially engineered photonic crystals. The optical dispersion of these crystals can deliver resolution of 0.4 nm at a wavelength of 1.5 µm. However, these devices rely on out-of-plane detection and free space propagation, and so are not fully integrated on-chip devices.

SUMMARY OF THE INVENTION

According to the present invention, there is provided an optical system or apparatus comprising a randomizer that includes randomly positioned particles for randomizing light to provide a speckle pattern and a detector for detecting and analyzing the randomized light to determine one or more properties of the light. Preferably, the randomizer is transmissive.

The one or more properties of the light may be selected from: wavelength, polarization, coherence and beam shape parameters.

The system or apparatus may be a wavelength meter or a spectrometer or an interferometer.

Preferably, the randomizer comprises a thin layer or film. The thickness of the thin layer or film may be less than 100 µm, and ideally less than 50 µm.

The present invention provides a wavefront mixing process that acts as a generalised interferometer, delivering a different speckle pattern for each different incident beam. This property can be used, for example, to simultaneously measure the azimuthal and radial modes of Laguerre-Gaussian beams. The same approach can be used to measure other key properties of the light field such as polarisation state or wavelength.

The randomizer may comprise a layer of film of randomly positioned particles, for example aluminium particles, which cause a speckle pattern to be formed.

The randomizer may comprise randomly positioned particles suspended in a matrix. The matrix may comprise bulk material or may be a thin planar layer.

The randomizer may comprise a layer of randomly positioned particles, for example aluminium particles. The randomizer may comprise a layer or slice of biological material, such as a slice of biological tissue. The randomizer may be provided as a thin film that can be positioned in front of or on an optical path from a light source.

The randomizer may be positioned in an optical cavity, for example a Fabry Perot cavity.

The randomizer may be reflective. The randomizer may comprise a hollow element for internally reflecting and randomizing light to generate a speckle pattern. The randomizer may comprise a hollow sphere, for example an integrating sphere, or a hollow tube.

A single mode fibre may be provided for transmitting single mode light to the randomizer. This avoids issues with beam size matching and incident beam dimensions.

Principal component analysis (PCA) may be used to analyse the randomized light to determine the wavelength of the light.

A variable optical element or device may be provided in front of the randomizer for varying the light incident on the randomizer. The variable optical element or device may be operable to vary the amplitude and/or phase of light. The variable optical element or device may comprise at least one of a deformable mirror, a spatial light modulator, for example a liquid crystal spatial light modulator, and a digital micro-mirror.

Multiple randomisers may be provided. The randomisers may be periodically spaced. The randomisers may be positioned to deliver a speckle pattern that is most efficient at a specific wavelength.

According to another aspect of the invention, there is provided a laser comprising a controllable laser source, a randomizer for randomizing light from the controllable laser source to generate a speckle pattern; a detector for detecting and analyzing the speckle pattern to determine one or more properties of the light; a controller for controlling the controllable laser source based on the determined one or more properties of the light.

Preferably the randomiser comprises a plurality of randomly positioned scatterers for scattering and thereby randomizing light to generate a speckle pattern. The randomiser may comprise a thin layer or film of randomly positioned particles. The randomiser may comprise a matrix in which randomly positioned particles are suspended. The randomiser may comprise bulk material.

The randomizer may be reflective. The randomizer may comprise a hollow element for internally reflecting and randomizing light to generate a speckle pattern. The randomizer may comprise a hollow sphere, for example an integrating sphere, or a hollow tube.

According to yet another aspect of the invention, there is provided a laser stabilisation system for stabilising the output of a controllable laser source, the stabilisation system comprising a randomizer for randomizing light from the controllable laser source to generate a speckle pattern; a detector for detecting and analyzing the speckle pattern to determine one or more properties of the light; and a controller for controlling the controllable laser source based on the determined one or more properties of the light. Preferably the randomiser comprises a plurality of randomly positioned scatterers for scattering and thereby randomizing light to generate a speckle pattern. The randomiser may comprise a thin layer or film of randomly positioned particles. The randomiser may comprise a matrix in which randomly positioned particles are suspended. The randomiser may comprise bulk material.

Multiple detectors may be provided and at least part of the speckle pattern is incident on the multiple detectors. Different parts of the speckle pattern may be incident on different detectors. Different detectors may be operable to determine different properties of the light. The different detectors may be operable to simultaneously determine the different properties of the light.

According to yet another aspect of the invention, there is provided an optical system comprising a randomizer for randomizing light to generate a speckle pattern, at least one detector for detecting and analyzing the speckle pattern to determine one or more properties of the light, and a variable optical element or device in front of the randomizer for varying the light incident on the randomizer. The variable optical element or device may be operable to vary the amplitude and/or phase of light. The variable optical element or device may comprise at least one of a deformable mirror, a spatial light modulator, for example a liquid crystal spatial light modulator, and a digital micro-mirror. Multiple detectors and means for diverting or directing the speckle pattern to the multiple detectors may be provided. The means for diverting or directing may be operable to divert different parts of the speckle pattern to different detectors. The means for diverting or directing may comprise one or more optical devices or elements. For example, the means for diverting or directing may comprise a controllable beam shaping device, such as a deformable mirror, spatial light modulator, digital micro-mirror.

According to still another aspect of the invention, there is provided an optical system comprising a randomizer for randomizing light to generate a speckle pattern, multiple detectors for detecting and analyzing the speckle pattern to determine one or more properties of the light, and means for diverting or directing the speckle pattern to the multiple detectors. The means for diverting or directing are operable to divert different parts of the speckle pattern to different detectors. The means for diverting or directing may comprise one or more optical devices or elements. For example, the means for diverting or directing may comprise a controllable beam shaping device, such as a deformable mirror, spatial light modulator, digital micro-mirror. A variable optical element or device may be provided in front of the randomizer for varying the light incident on the randomizer.

Using the scattering properties of a remarkably simple thin diffuser, it is possible to detect the wavelength of a monochromatic beam to picometer precision. This approach may be extended to even higher resolution through the use of an optical cavity placed around the randomizing medium. This allows an ultra-compact spectrometer and new methods for laser/beam stabilisation based on analysis of the speckle fields.

BRIEF DESCRIPTION OF THE DRAWINGS

Various aspects of the invention will now be described by way of example only and with reference to the accompanying drawings, of which.

DETAILED DESCRIPTION OF THE DRAWINGS

The present invention uses random scatterers to generate speckle patterns from coherent light, so that properties of the light can be measured, such as wavelength, polarization and coherence. Light that has passed through the random scatterers is analysed using principal component analysis. Before the random scatterers, a coherent beam can be seen as a superposition of many beamlets. After its propagation through the random scatterers, an interference pattern is observed between the constituent beamlets, each having changed directions, spot sizes and relative phases.

Figure 1:
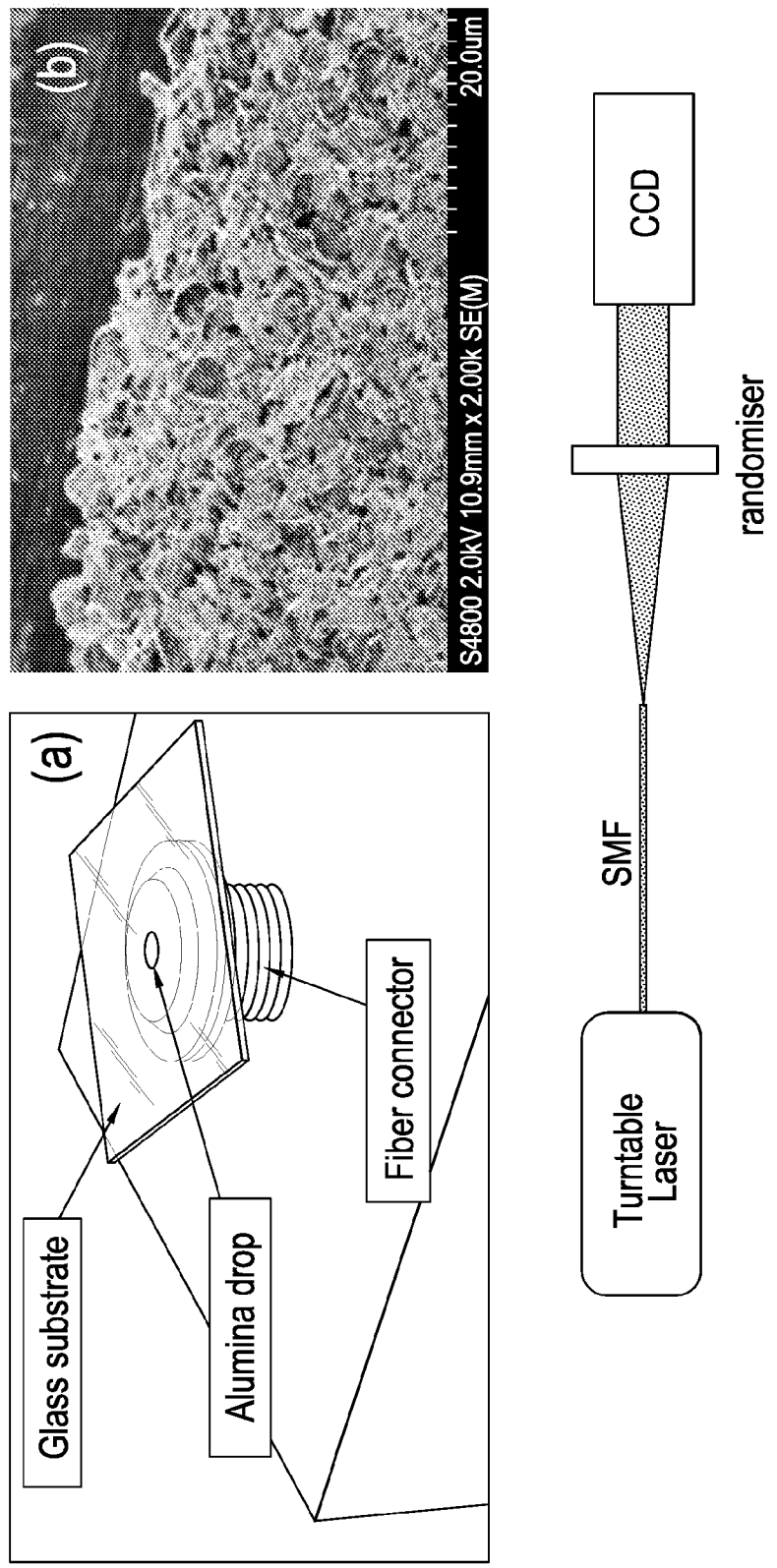
FIG. 1 is a schematic view of a speckle pattern spectrometer.

FIG. 1 shows spectrometer that has a tunable laser source that outputs variable wavelength light into a single mode fibre. Light emitted from the fibre is incident on a transmissive randomizer that forms a speckle pattern. Light that has passed through the randomizer is incident on a CCD camera (Pike, Allied Vision Technologies, pixel size: 7.4 μm×7.4 μm). The speckle pattern detected at the detector is wavelength dependent, and can be used to determine the wavelength of light from the source.

Two laser sources were used to test the spectrometer of FIG. 1: a tuneable narrow linewidth Littman cavity diode laser system (Sacher Lasertechnik, 785 nm, line width<1 MHz, TEC-510-0780-100) and a Ti:sapphire laser (Spectra-Physics, line width 0.5 GHz, tuneable 700 nm 1000 nm, model 3900S). A HighFinesse/Angstrom WS7 super-precision wavelength meter was used for an independent calibration of each tunable laser source. The diode laser source was used in the narrow wavelength range study (≈0.5 nm), whereas the Ti:sapphire laser source allowed testing over a larger wavelength range. To exclude laser beam variability when tuning the laser, both laser beams were filtered by coupling their outputs into single mode fibers.

Two different geometries were considered for the randomizer. In a first approach, a thin layer of random aluminium particles was used. This was formed using a small drop (≈5 µl) of a commercially available solution of alumina particles with a mean size of 5 µm and deionised water on a glass substrate. The glass slide was 160 µm thick and was cleaned with 5 minutes long immersions in Acetone and Isopropanol in an ultrasonic bath, followed by Oxygen-based plasma ashing at 100 W. Care was taken in letting the de-ionised water evaporate slowly to minimise curling of the surface of the drying drop (see FIG. 1(a-b)). The dried drop was measured to be 40 µm±10 µm thick. In a second approach, two high reflective laser-cavity mirrors within which a random diffuser was inserted were used to create a randomized Fabry-Perot cavity.

To determine the wavelength corresponding to a given speckle pattern the random wavelength meter has to be calibrated. This is done by recording the speckle pattern for each wavelength to be detected. More precisely, a number N of patterns is measured, where each speckle pattern is defined by a two dimensional array corresponding to the intensities measured by the CCD camera. This delivers a higher order array corresponding to the intensities measured by the camera $A_{ijk}$ where the subscripts i and j are the pixel coordinates on the camera and k an index distinguishing between different measurements. These different measurements either correspond to different wavelengths λ or to multiple exposures having the same wavelength but probing the fluctuations of the optical system. FIG. 2(b) shows an example speckle pattern used in the calibration part of the experiment.

Once calibration is completed, the largest variations between the different speckle patterns are measured using the multivariate principal component analysis (PCA). In a first step, the average speckle image is subtracted from every measured image $\hat{A}_{ijk} = A_{ijk} - \langle A \rangle_{ij}$ where <·> stand for the average over the index k. The pixel coordinates part of the intensity array are flattened (for example a 2 by image is flattened as: pixel (1,1)→1, pixel (1,2)→2, pixel (2,1)→3 and pixel (2,2)→4). This flattening process transforms the higher order array into a normal array $a_{mk} = \hat{A}_{ijk}$ where the index m=1 . . . N corresponds to a unique mapping from the (i, j) pair to the linear index m. The principal components are obtained by calculating the eigenvectors of the matrix $$M = aa^T$$

where the T superscript stands for the matrix transposition. The covariance matrix M is N by N sized. Each eigenvector has N elements and can be recast in the image form by exchanging the linear index m to the pair index (i, j). The eigenvector with the largest eigenvalue is called the first principal component (PC), the second largest to the second principal component and so on.

The distribution of eigenvalues allows determination of the number of degrees of freedom that the speckle pattern can access as the wavelength is varied. One method to calculate this number is by determining the number of eigenvalues whose sum is equal to 90% or similar threshold of the sum of all the eigenvalues. The larger this number is the larger the speckle pattern variability for a given wavelength variation. The wavelength resolution of the random spectrometer is higher the larger the number of degrees of freedom.

Figure 2:
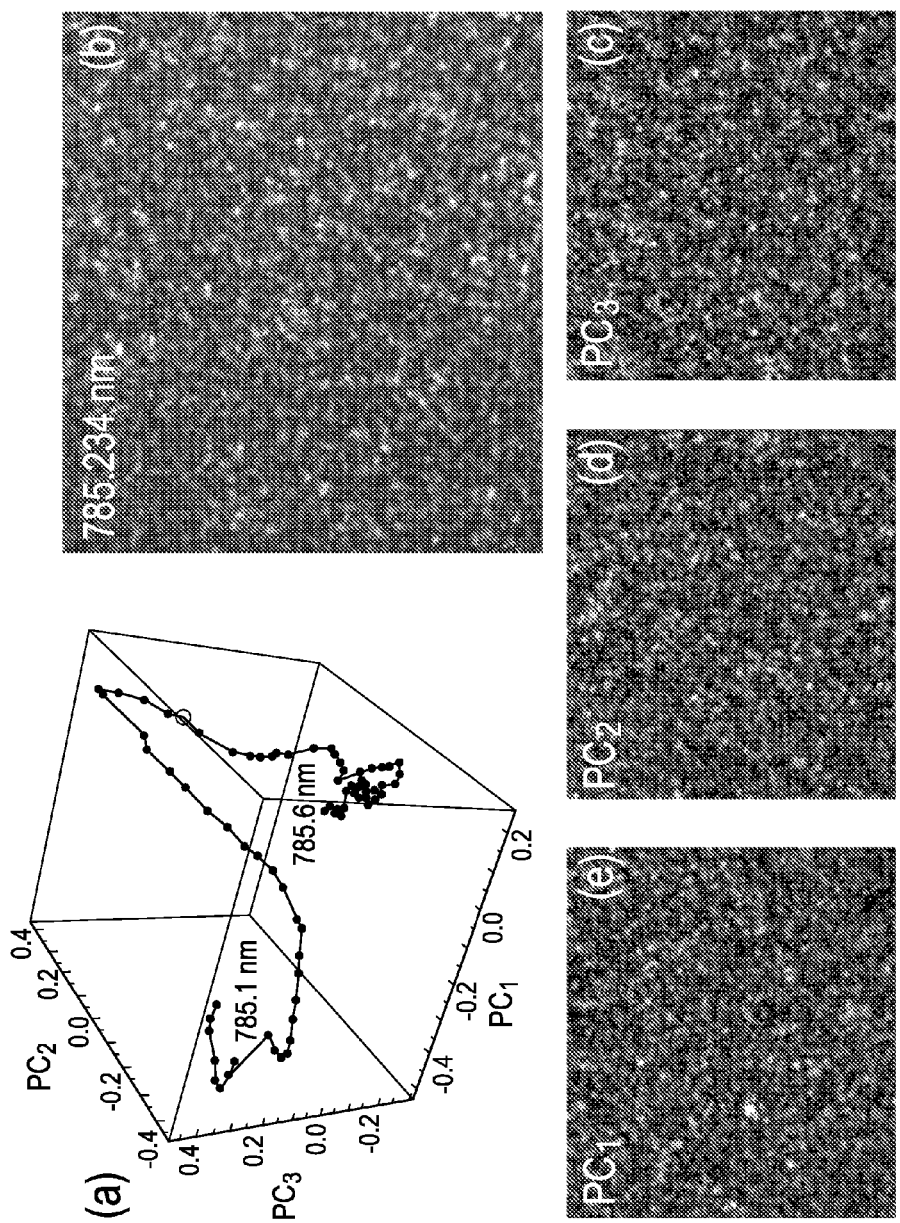
FIG. 2(a) shows a PCA decomposition of a detected speckle pattern as a function of the laser wavelength varying between 785.1 nm and 785.6 nm.
FIG. 2(b) shows an example of a far-field speckle pattern observed at 785.234 nm.
FIGS. 2(c) to (e) show the first three principal components $PC_1$, $PC_2$ and $PC_3$ which correspond to the first three degrees of freedom detectable by the speckle pattern.

The determination of the PC allows the representation of the speckle patterns in PC space. Each measured speckle pattern can de decomposed into a static background (the average speckle pattern) and the weighted sum of a few principal components accounting most variations. FIG. 2(c-e) shows the first three principal components $PC_1$, $PC_2$ and $PC_3$, which correspond to the first three degrees of freedom detectable by the speckle pattern. The three patterns look similar to each other. However, due to their eigenvector origin these patterns are orthogonal to each other and each one corresponds to an independent degree of freedom. Indeed, by construction, the matrix M is a positive semi-definite symmetric matrix whose eigenvectors are orthogonal to each other.

After decomposition, each speckle pattern can be represented by a small number of amplitudes corresponding to the coordinates of a point in the PC space. Here, the first eight PCs were used to represent each pattern. FIG. 2 shows experimental measured wavelength using the alumina randomizer in direct illumination. FIG. 2(a) shows a PCA decomposition of the detected speckle pattern as a function of the laser wavelength varying between 785.1 nm and 785.6 nm. FIG. 2(b) shows an example of a far-field speckle pattern observed at 785.234 nm.

FIG. 2a shows the parametric curve described in the PC space (subspace defined by the first three PC) by the speckle pattern as the wavelength is varied over a range of 0.5 nm. In this, the parametric curve does not have a uniform length variation as a function of wavelength. This effect would have an adverse effect on the uniformity of the wavelength resolution of our approach. In FIG. 2a, only the first three PC of the decomposition are represented. FIGS. 2c to (e) show the first three principal components used in the decomposition. There are five further decomposition coefficients for each speckle pattern. Taking into account all eight PC decomposition coefficients greatly diminishes this effect and explains how the PCA method can deliver high resolution.

Once the wave meter is calibrated, the speckle pattern of an unknown wavelength is recorded. This pattern is decomposed in the previously calibrated PC space. The wavelength can be established using for example a nearest neighbour, Mahalanobis distance or linear regression classification method. All these classification methods deliver perfect results (no error) if the detected wavelength is part of the calibration set.

Figure 3:
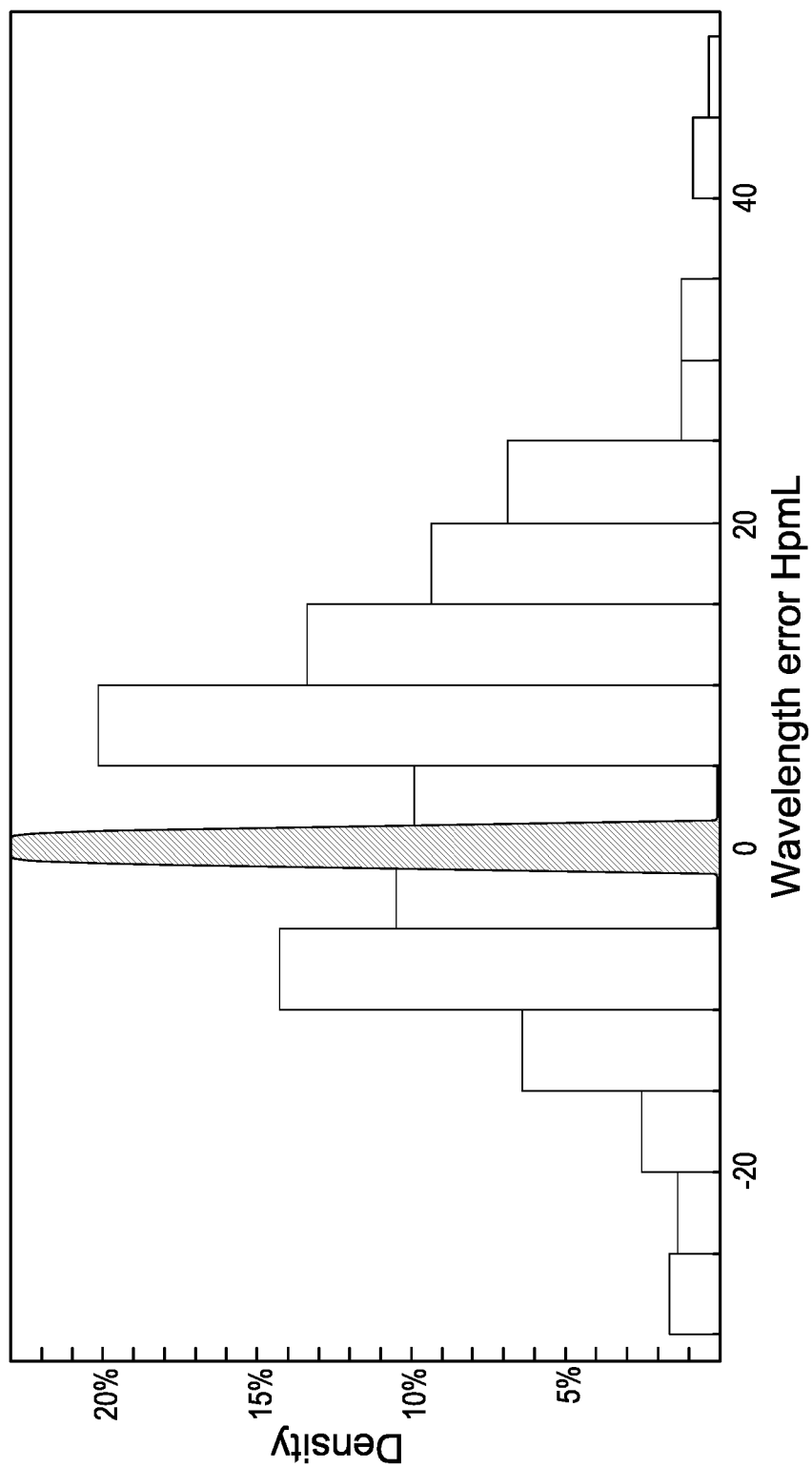
FIG. 3 shows measured wavelength error distribution in the case of the alumina.

FIG. 3 shows measured wavelength error distribution in the case of the alumina drop in direct illumination. The bar chart shows the error distribution (bar chart) for the partial least squares regression and (red curve) for the nearest neighbour classification. The regression has a standard error deviation of 13 pm. The nearest neighbour classification was without error. This perfect result can be understood by considering the approach in the context of wavelength classification. Indeed, for speckle pattern fluctuations smaller than the step size used for the speckle pattern training set, the classification approach will always deliver the nominal classification wavelength with no error at all.

Provided the parametric curve in the PC space is smooth, continuous and locally linear, it is also possible to measure an unknown wavelength using for example partial least squares (PLS) regression in the PC space. PLS is used to detect the wavelength and determine its standard error deviation when the unknown wavelength is not necessarily part of the calibration set. FIG. 3 shows that the standard deviation of the error is approximately 13 pm. This can be improved by considering smaller wavelength steps in the training set yielding locally smaller deviations from linear variation between each training step.

There are routes to improve on the sensitivity of the randomizer by including an optical feedback mechanism. This can the achieved by embedding the random scattering medium within a Fabry Perot cavity. The main difference between the two devices was the much lower transmission intensity through the Fabry Perot based device and the resulting need for an increased exposure time of the CCD detector. No resolution improvement was observed when using the specific Fabry Perot cavity.

Figure 4:
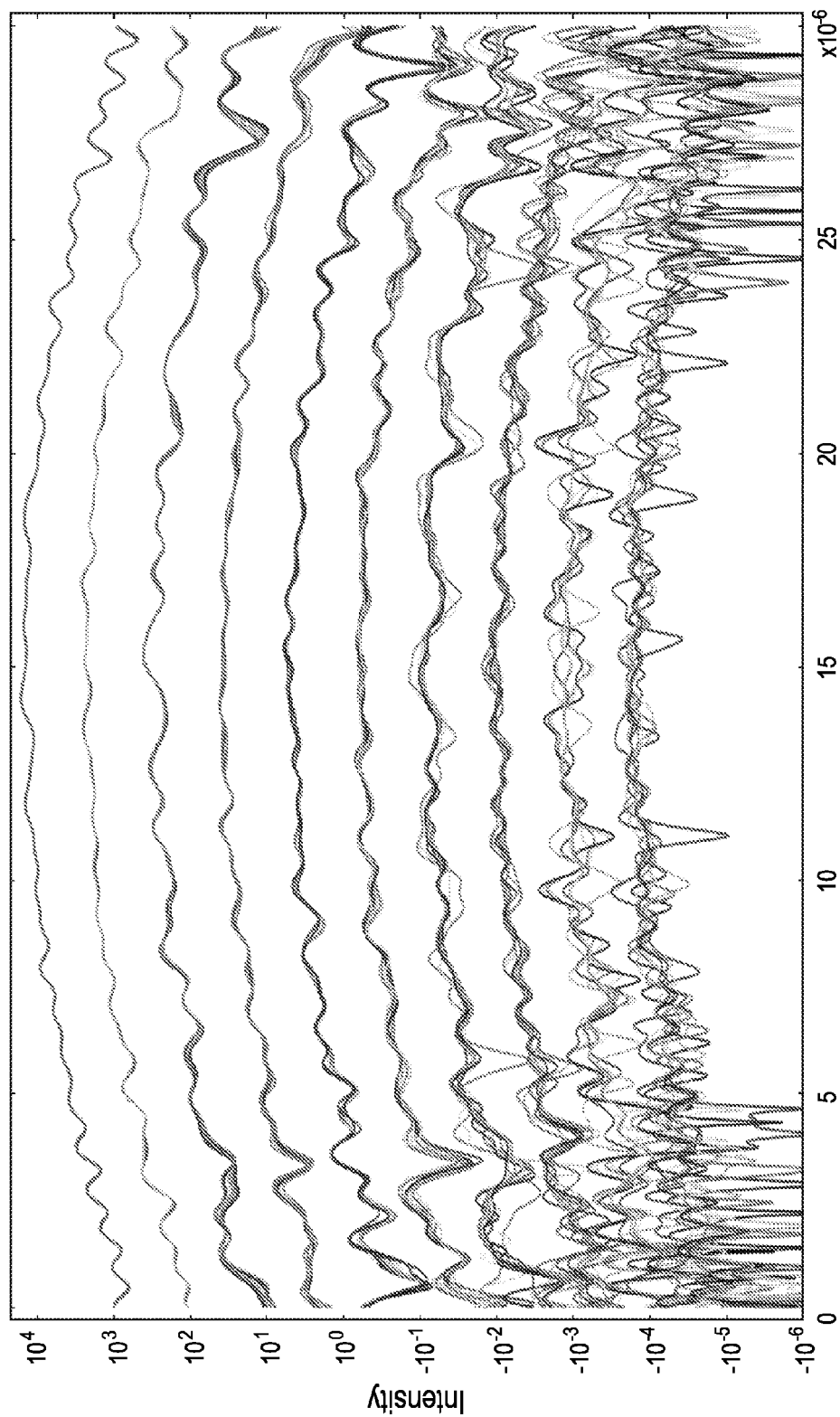
FIG. 4 shows modelled speckle pattern variability for a random diffuser inside a Fabry Perot cavity.

FIG. 4 shows modelled speckle pattern variability for a random diffuser inside a Fabry Perot cavity composed of two distributed Brag reflectors having an increasing number of periods i.e. increasing reflectivity. The different colours correspond to different incident wavelengths. FIG. 4 shows a potential advantage of this configuration, i.e. the variability of the speckle pattern vs. wavelength change is increased as the cavity provides more feedback. This improvement is ultimately limited by the loss in transmission efficiency.

It is possible to generalise the training method to go beyond the detection of a single parameter, so that multiple parameters can be measured at the same time. This includes not only beam shape parameters but also polarisation and multiple simultaneous wavelengths. This latter case enables the construction of compact purpose build spectrometers. Further, the simultaneous detection of changes in multiple beam parameters can give insight into a number of optical phenomena that all have an effect on the transmission of optical beams. Minute changes in these parameters can in effect be amplified by the multiple scattering in the random diffuser and detected with high sensitivity.

Whilst the optical system of FIG. 1 shows a single randomiser, multiple such randomisers can be provided. This helps improve sensitivity at specific wavelengths. The position of each layer is chosen to deliver an interference pattern that is most efficient at a specific wavelength. The multiple layers are, in effect, periodic in one direction and random in two directions, so that they behave like a photonic crystal in one direction and a random scatterer in the other two directions.

The sensitivity, contrast and accuracy of the optical system of the present invention can be adjusted through the use of at least one controllable device that can control the amplitude or phase of a light field. Such controllable devices include deformable mirror is, liquid crystal spatial light modulators and digital micro-mirror devices. The controllable device is positioned at the input of the randomiser. Using such devices, multiple patterns can be generated from the same beam. This increases the amount of information that can be measured simultaneously.

The invention is generic in that it can be used to detect not only the wavelength but, using suitable training, the polarization state and/or shape of the incident beam. Because of this, it is important to limit the number degrees of freedom that the random spectrometer is trained for. Here, a single mode fibre (SMF) has been used to limit the system to a single variable, the wavelength. In effect, the SMF acts as the input slit in a monochromator ensuring that at the output of the monochromator only variations in wavelength generate an intensity variation. However, replacing the SMF by a multimode fibre or pinhole would add to the wavelength variability of the speckle pattern the variations due to the beam shape.

Using a simple random medium in accordance with the invention can provide a wavelength meter with picometer resolution, exploiting the large number of degrees of freedom associated with the light transmission through this disordered medium. Implementations of the meter achieved a 13 pm resolution and a bandwidth of 10 nm at a wavelength of 800 nm. The concept can be extended to random media within a cavity. This can enhance its wavelength sensitivity at the expense of transmitted intensity. This concept may be extended to the development of specialised spectrometers and for use for laser stabilization.

Figure 5:
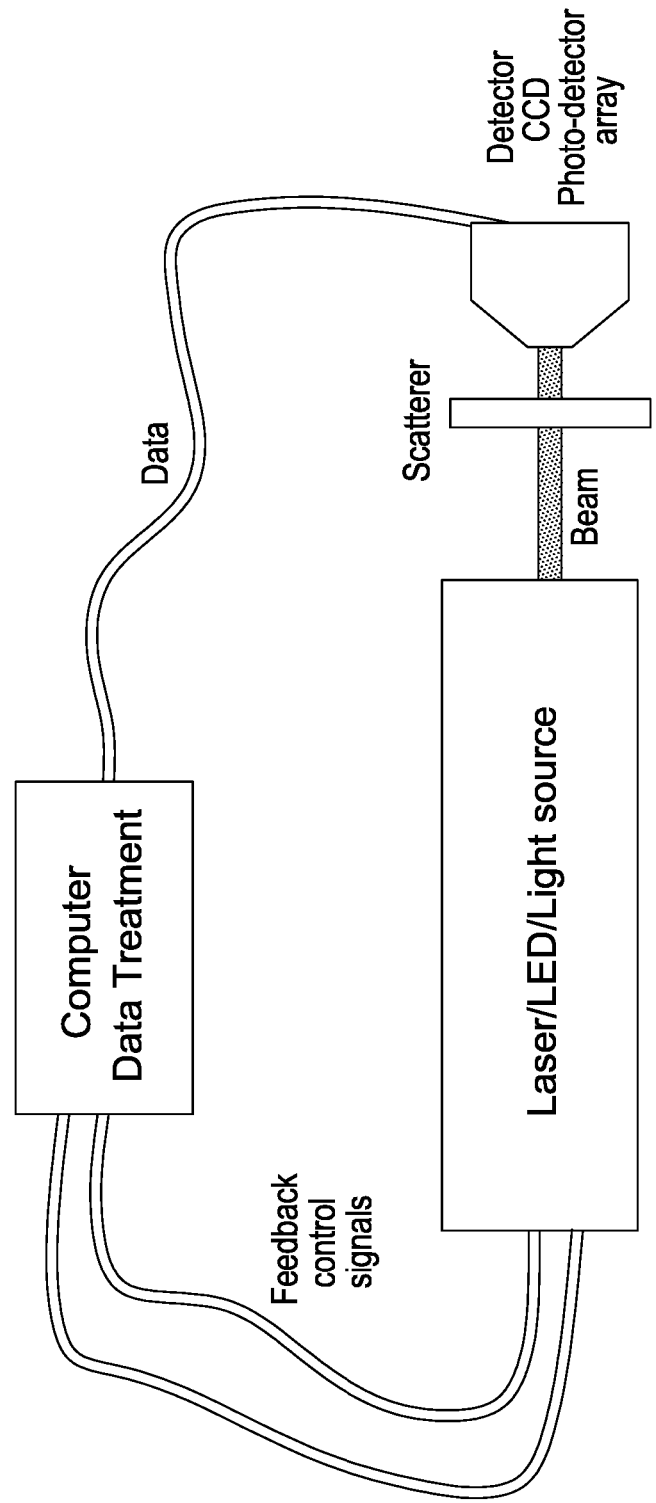
FIG. 5 is a schematic diagram of a laser stabilization system that uses speckle pattern detection to control laser parameters.

FIG. 5 shows a laser stabilization system that uses speckle pattern detection to stabilize laser characteristics. This has a computer-controlled light source, for example a laser or LED, which emits an output beam along an optical path and through a transmissive randomizer that is arranged to generate a speckle pattern. At an output of the randomiser, a detector is provided for detecting the speckle pattern, thereby to determine one or more characteristics of the output beam. Data relating to the characteristics determined is fed back to the laser's computer-control system, which varies one or more operational parameters of the laser to achieve a desired output. For example, the intra/extra cavity grating could be varied, as could the cavity length, the operating temperature and the pump current. Indeed any controllable operational parameter could be varied based on feedback from the detector until the desired output is achieved.

In some circumstances, if data acquisition speed is important, some of the principal component analysis can be achieved in the optical domain. To do this, a controllable beam shaping device, such as a deformable mirror, spatial light modulator, digital micro-mirror, is placed at the output of the randomizer. The controllable beam shaping device is then arranged to direct certain parts of the speckle pattern to different detectors. The intensity of these new beams will correspond to the principal components. The detectors can be single photodetectors, quad photodetectors, balanced photodetectors or an array of one or more of these detectors. Adding or subtracting photocurrents from the multiple detectors, and applying the appropriate weighting factors, provides the PC coefficient for fast data acquisition. This is typically needed for implementing a feedback loop, as would be required for the laser stabilisation system of FIG. 5.

Figure 6:
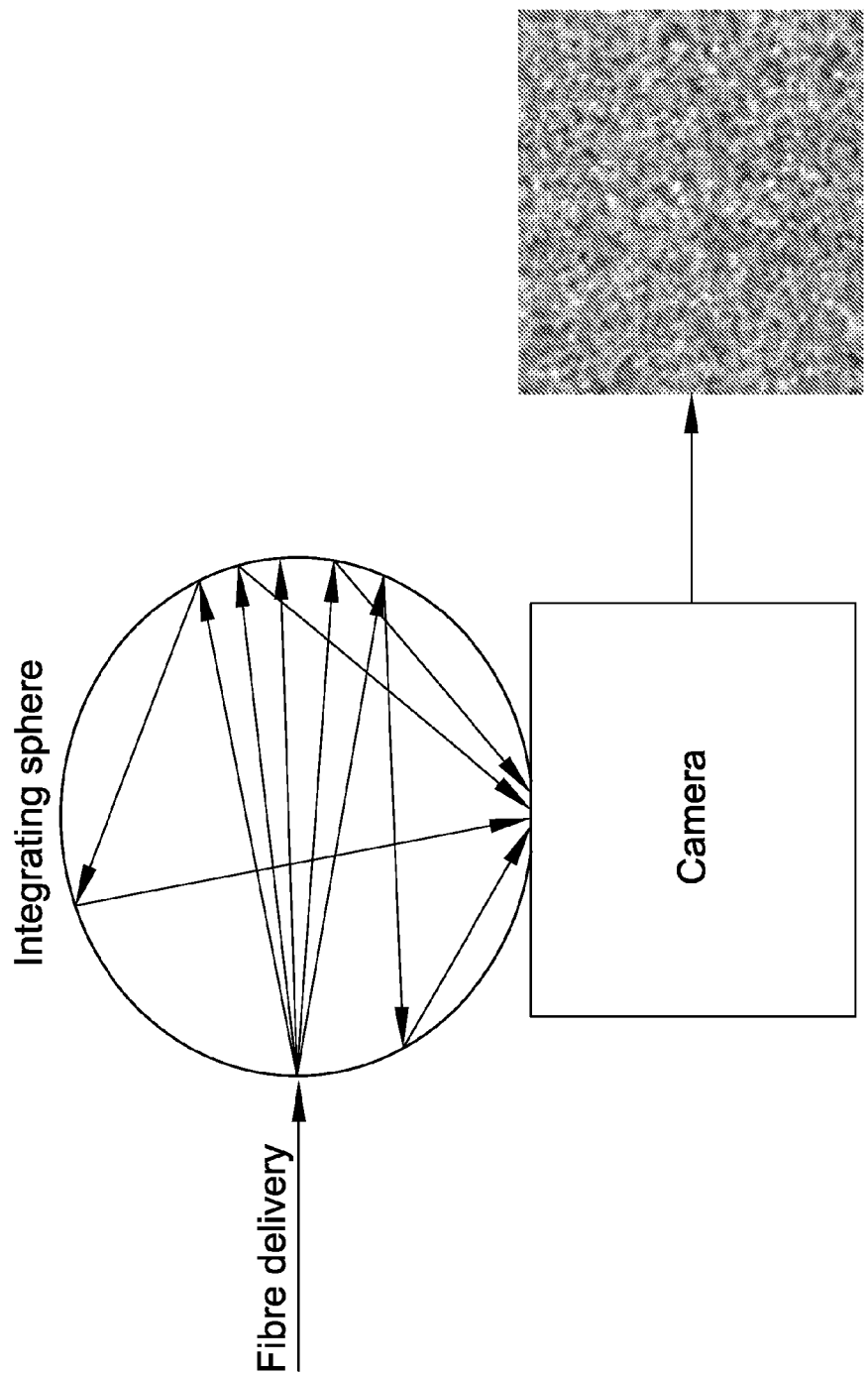
FIG. 6 is a schematic diagram of a wavelength spectrometer including an integrating sphere.

FIG. 6 shows another example of a randomiser. This has a fibre for delivering laser light to an integrating sphere and a camera for capturing a speckle pattern generated by the integrating sphere. The fibre is a single mode fibre that ensures wavelength change does not affect beam shape. The integrating sphere is arranged to provide spatial randomisation of the input light field with low loss.

The integrating sphere has a coating that is highly reflective at the wavelength of interest on its inner surface. The coating diffuses light in a manner similar to the thin diffuser described above, but in reflection. Light reflects back and forth inside the sphere until ultimately it is detected at the output port with the camera or the array of detectors. Inside the sphere, a number of coated baffles (not shown) is provided to block a direct light path between input and output port. The material of the sphere ideally should have high thermal stability, so as not to change its optical properties as a result of small temperature fluctuations. The sphere may also be stabilised in temperature using thermo-electric Peltier elements, for example. Further temperature stabilisation can also be achieved by cooling the integrating sphere in a constant temperature liquid bath. The surfaces inside the integrating sphere are treated to ensure high diffusive reflection. The imaging part of the integrating sphere corresponds to an output port of the integrating sphere. No further optics are required on this port, although one or more optical elements could be used to enlarge or shrink the speckle pattern.

The laser beam that is to be measured or stabilized is optically coupled to the single mode fibre. Light coming out of the single mode fibre does not change its beam profile as the wavelength changes. The output light from the fibre is used to illuminate the input port of the integrating sphere. The integrating sphere creates highly wavelength sensitive speckle patterns. This is achieved through the many diffuse reflections inside the sphere that the light field makes before reaching the output port and the camera. In effect, the camera measures the speckle pattern created from the interference between the many paths the light is taking inside the sphere. As the distances between successive diffusive reflections inside the sphere are large this speckle pattern has a high sensitivity to small wavelength changes. In general, the speckle wavelength resolution/sensitivity is proportional to the optical path-length inside the speckle-generating device.

Figure 7:
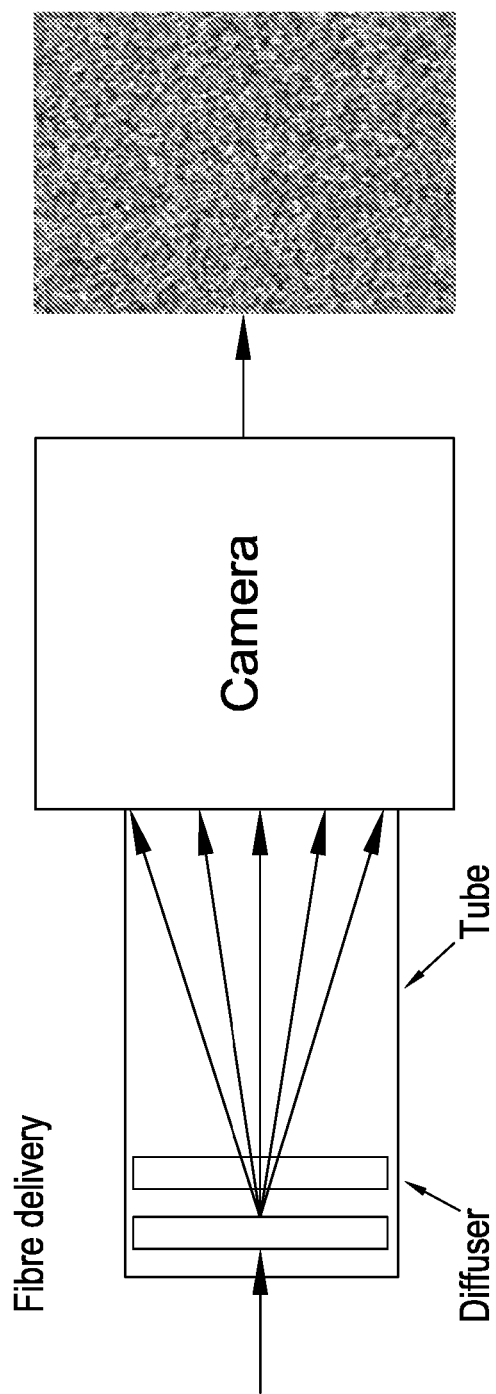
FIG. 7 is a schematic diagram of a tube-based assembly of a wavelength spectrometer.

FIG. 7 shows another example of a hollow, reflective randomiser. In this case, the randomiser is a reflecting tube with multiple parallel diffusers (for example as described previously) inside it to create a low loss high stability optical arrangement. FIG. 7 shows two diffusers, but it will be appreciated that more could be used to form a cascaded series. Optionally, an inner surface of the tube may be coated with a highly reflective, diffusive material, as described with reference to the integrating sphere. As before, a fibre is used to deliver laser light to the reflective randomiser and a camera is provided for capturing a speckle pattern generated by the reflective randomiser. The fibre is a single mode fibre that ensures wavelength change does not affect beam shape. The tube randomiser is arranged to provide spatial randomisation of the input light field with low loss and high stability.

In the examples shown in FIGS. 6 and 7, the detector used is a camera. However, any suitable detector could be used, for example an array of detectors, such as an array of quadrant photo diode (QPD) detectors. Also, it should be noted that the shape and size of the hollow reflector, for example the sphere or tube, can be changed or engineered to achieve different wavelength sensitivities and environmental stability (temperature, etc).

Figure 8:
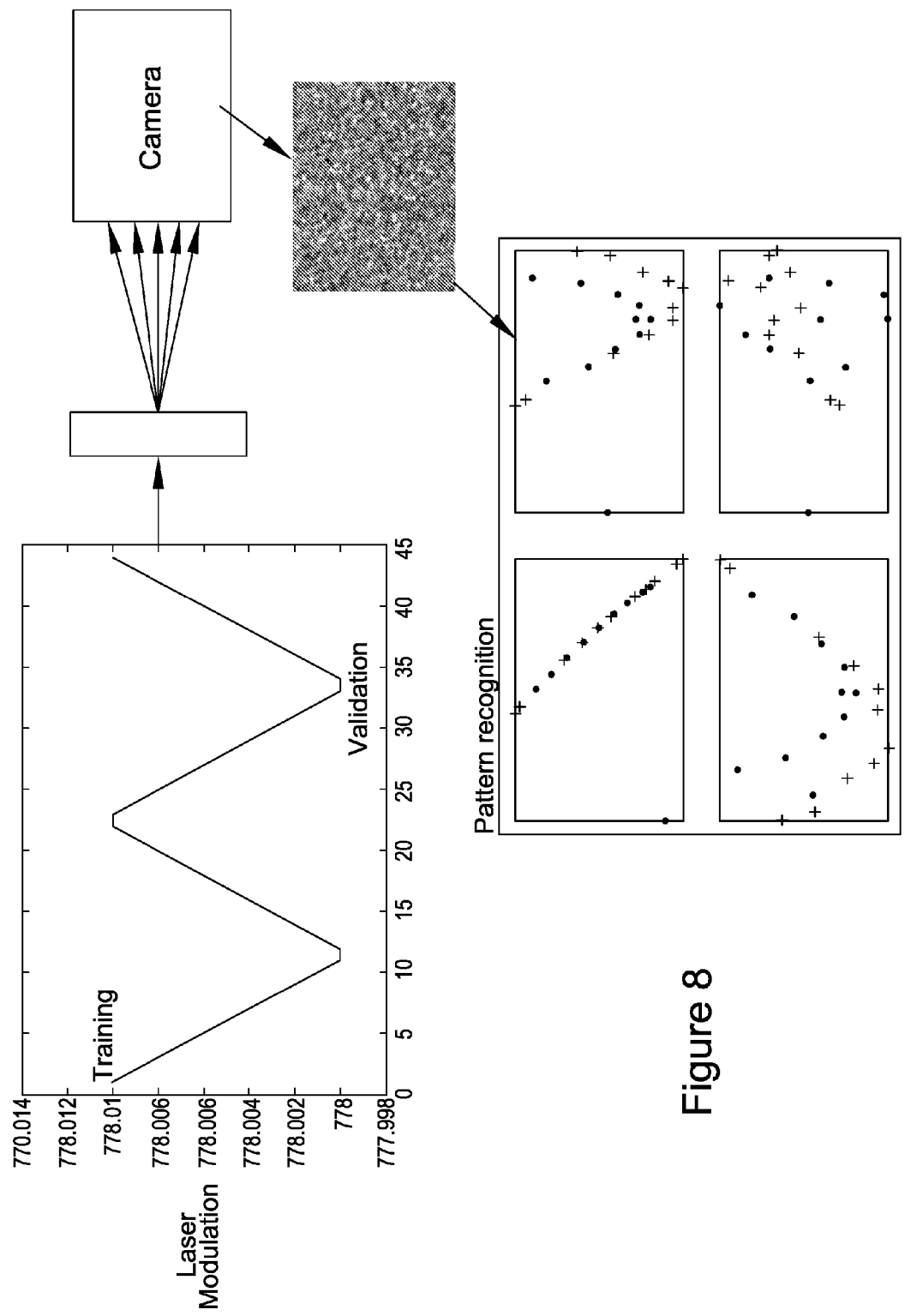
FIG. 8 is a schematic diagram of various stages of operation of a speckle pattern spectrometer.

FIG. 8 shows a method for measuring average wavelength changes of a laser beam whose wavelength is modulated periodically. The first half period is used to train (calibrate) the speckle pattern using the principal components method and then subsequent half periods are used to validate (double check) the training. In this instance, the calibration and the validation steps need an external wavelength meter to deliver absolute wavelength measure that can be used to calibrate the speckle pattern. In the validation step the external wavelength meter is used to verify the wavelength detected by the speckle wavelength meter. The left hand figure shows the wavelength changes as a function of time as measured by a standard wavelength meter superimposed by the wavelength detected by the speckle spectrometer. The right hand figure shows the schematics of the setup consisting of the laser beam, randomiser, camera and detected speckle pattern. The lower part of FIG. 8 illustrates the principal components training approach. The four panels correspond to the projections of the detected speckle patterns onto the principal components. In order, these are: the first principal component versus the second principal component; the first principal component versus the third principal component; the second principal component versus the third principal component and the second principal component versus the forth principal component.

The method described with reference to FIG. 8 requires the use of an external wavelength meter for calibration. In another approach, the need for an external meter can be avoided. In this case, one or more optical components are varied in such a way as to cause periodic oscillations in the laser output, for example the wavelength. These periodic oscillations can be detected as periodic oscillations in the first few principal components. Knowing the oscillation amplitude enables the measurement and detection of relative wavelength changes that can be used to create a feedback loop without prior calibration. This approach can be used to minimise the effect of thermal drift by monitoring high frequency periodic wavelength oscillations. If the frequency of the wavelength modulation is higher than the bandwidth of the thermal fluctuations then it is possible to measure wavelength drifts of the laser beam in a time short enough to avoid any interference with the thermal drift of the speckle pattern generating device.

Figure 9:
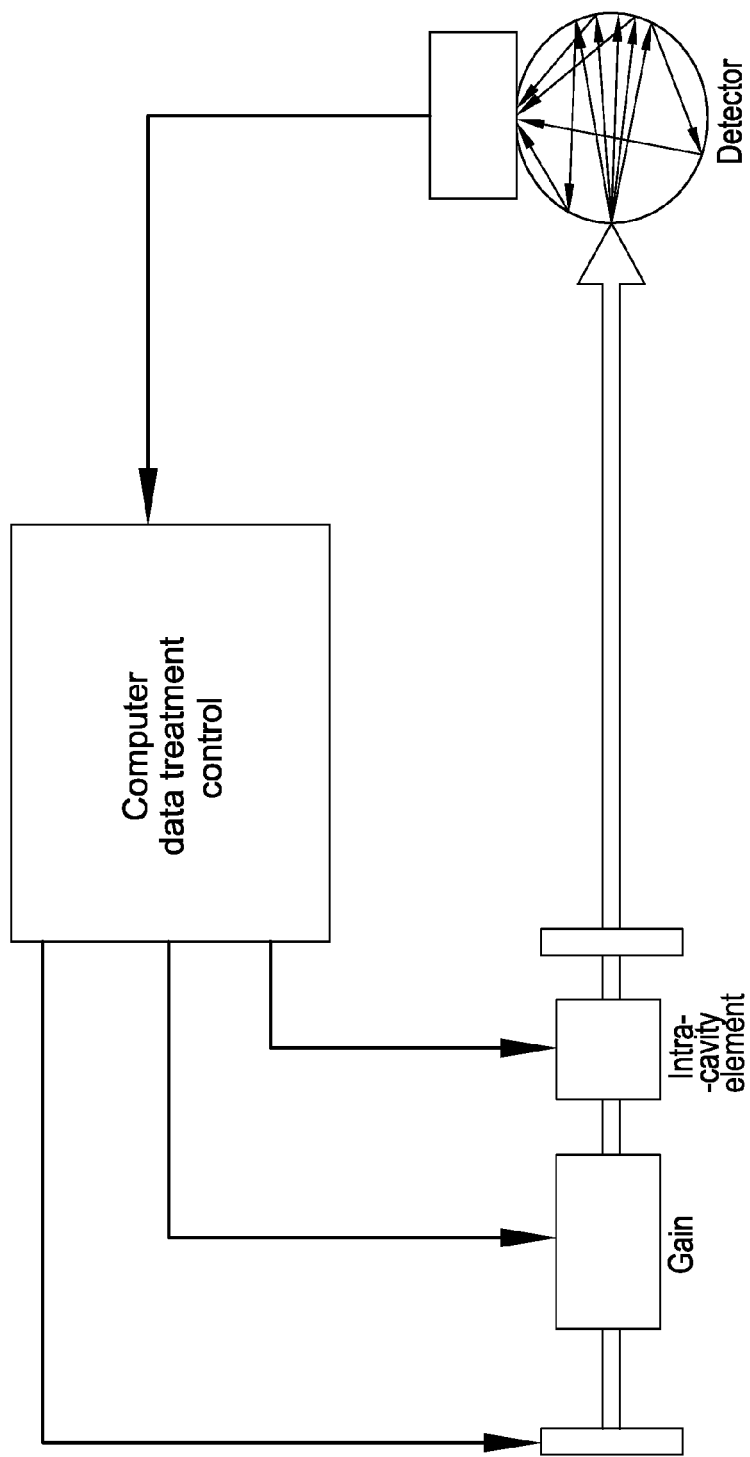
FIG. 9 is a schematic diagram of another laser stabilization system.

FIG. 9 shows a laser with a wavelength stabilisation system in accordance with the invention. This has a laser cavity defined by two reflectors, one of which allows some light to be output. In the cavity, there is provided a gain medium and an intracavity element. At an output of the laser is a speckle pattern wave meter. In the example shown, the speckle pattern wave meter has an integrating sphere and a camera/detector that is connected to a controller. However, any of the other speckle pattern wave meters described herein could be used. The controller is connected to the first mirror, the gain medium and the intracavity element. Each of these three components can be controlled by the controller to vary the wavelength at the laser output. Hence, the laser output can be influenced via multiple channels. By varying the position of the mirror, the cavity length can be changed. By varying the potential applied to the gain material the laser gain can be varied. By varying the intracavity active elements (such as filters or beam shapers), for example by moving them into or out of the optical path, again the laser output can be varied. Each of these laser control channels can be used to create changes in laser beam properties, which can be detected as changing speckle pattern after the randomiser.

The system of FIG. 9 can be calibrated to compensate for relative wavelength changes without using an external wave meter. As an example, the input channels controlling the laser could be modulated at high (known) frequency (above thermal noise). Each channel can be modulated with a different frequency. Then variations of the speckle pattern at each modulation frequency are determined. These variations can be determined using real-time multivariate analysis such as principal components analysis or singular value decomposition. Monitoring these oscillations allows any drift in the laser system to be detected. These can then be counteracted via the laser control channels.

Figure 10:
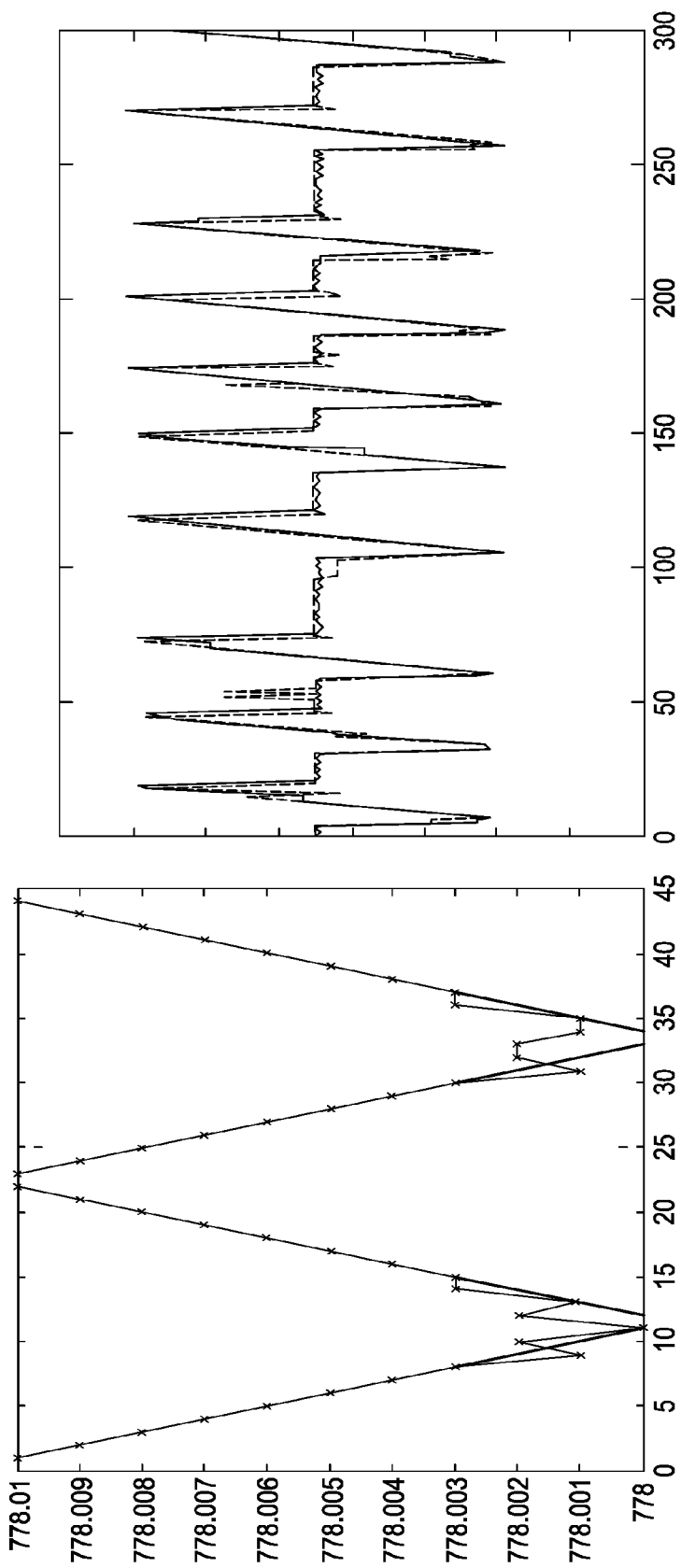
FIG. 10 shows high resolution training and validation of a laser system using a first method.
Figure 11:
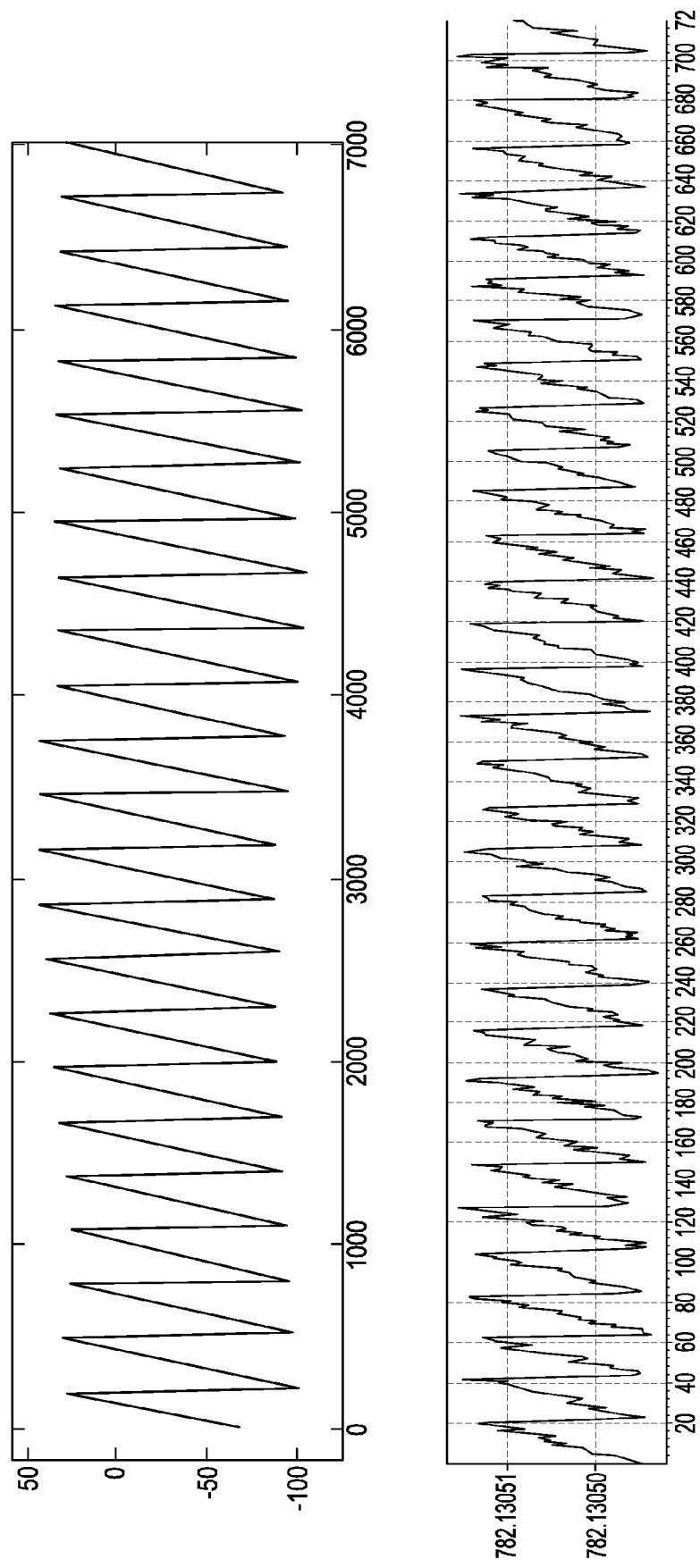
FIG. 11 shows high resolution training and validation of a laser system using a second method.

FIG. 10 and FIG. 11 show the results from the two approaches. FIG. 10 shows high resolution training and validation using an external wavelength meter resolving 10 pm. In FIG. 10, the left hand side is the training data and the right hand side is the validation. FIG. 11 shows high resolution training and validation using the second approach, i.e. the approach using relative properties and avoiding the need for an external wavelength meter for calibration. In FIG. 11, the training data is shown in the upper plot. The training is continuous using singular value decomposition. This means that the training slowly forgets old speckle patterns as new speckle patterns are acquired. The validation data is shown in the lower plot of FIG. 11. Here the resolution is 20 MHz (~0.1 pm) limited by the laser modulation amplitude.

In lasers, the optical properties of the active gain medium inside the laser cavity are highly temperature dependent. Usually, the gain medium is temperature stabilised through the use of a thermostat which measures the temperature of the gain medium using, for example, a thermo couple. By monitoring speckle pattern variations in accordance with the present invention, the impact on the output due to changes in the temperature of the gain material can be monitored and a feedback loop used to stabilise its optical properties directly (for example by varying the drive current).

As well as being used to stabilise lasers, the present invention could be used to stabilise other optical components, such as optical sensors. In particular, the speckle patterns of the invention can be used to stabilise, control or monitor optical components, which have outputs that are temperature dependent. The temperature dependence could be due to thermal expansion, contraction and refractive index changes with temperature. In practice, some of these changes are minute. However, speckle pattern changes can be used to detect these minute changes and measure an effect temperature change in the optical system. This temperature change can then either be monitored or used in a feedback loop adapted to control one or more parameters that effect temperature. The temperature dependent optical changes might not be associated with wavelength change only, but beam shape and polarisation might also change. In this case the speckle pattern device would not include the single mode fibre at the input which is used when detecting only wavelength changes.

In all the examples described above, the detector may include a processor or analyser for analyzing the speckle patterns to determine one or more parameters of the light and/or changes in such parameters. Alternatively, the analysis processor or analyser may be provided separately from any detector element. Equally, in all cases, multiple detectors or arrays of detectors may be provided and at least part of the speckle pattern may be incident on the multiple detectors. Different parts of the speckle pattern may be incident on different detectors. Different detectors may be operable to determine different properties of the light. The different detectors may be operable to simultaneously determine the different properties of the light.

The present invention provides a high resolution, high sensitivity speckled pattern wavelength meter. This allows the locking of a laser wavelength at any chosen wavelength. Additionally, it enables an ultrastable light source in the continuous wave and pulsed operational regimes of a laser device, because it is possible to counteract temporal, spectral, spatially and amplitude fluctuations of the laser device. Also, the characterised speckled pattern can be used as a "dial on demand" speckle pattern for structured illumination for imaging applications.

A skilled person will appreciate that variations of the disclosed arrangements are possible without departing from the invention. For example, whilst the analysis technique has been described based on PCA, it will be appreciated that other pattern detection methods could be used. Also, whilst the specific embodiment uses a single mode fibre to filter the randomised input beam, this is not essential. As well as being sensitive to wavelength, the speckle pattern is sensitive to beam shape and polarisation of the light field. Where information on these parameters is needed, the single mode fibre would not be used. Accordingly, the above description of the specific embodiment is made by way of example only and not for the purposes of limitation. It will be clear to the skilled person that minor modifications may be made without significant changes to the operation described.

The invention claimed is:

1. An optical system comprising:
    a randomizer that has a plurality of randomly positioned scatterers for scattering and thereby randomizing light to generate a speckle pattern; and
    a detector for detecting and analyzing the speckle pattern to determine at least one of:
    at least one property of the light and a change in the at least one property of the light,
    wherein the randomizer comprises a hollow element having an internal surface for reflecting the light into a space defined by the internal surface to thereby randomize the light and generate the speckle pattern.

2. An optical system as claimed in claim 1, wherein the at least one property of the light comprises one of more of wavelength of the light; polarization of the light; and spatial mode.

3. An optical system as claimed in claim 1, wherein the randomizer comprises randomly positioned particles.

4. An optical system as claimed in claim 1, wherein the randomizer comprises randomly positioned particles in a thin film or layer.

5. An optical system as claimed in claim 1, wherein the randomizer comprises randomly positioned particles suspended in a matrix.

6. An optical system as claimed in claim 1, wherein the randomizer comprises biological material that includes randomly positioned scatterers.

7. An optical system as claimed in claim 6, wherein the biological material comprises biological tissue.

8. An optical system as claimed in claim 1, wherein the randomizer is in an optical cavity.

9. An optical system as claimed in claim 8, wherein the optical cavity is a Fabry Perot cavity.

10. An optical system as claimed in claim 1, further comprising a single mode fibre for transmitting single mode light to the randomizer.

11. An optical system as claimed in claim 1, wherein the detector is arranged to use principal component analysis (PCA) to analyse the randomized light to determine the wavelength of the light.

12. An optical system as claimed in claim 1, wherein the randomizer comprises a layer of film less than 100 μm thick.

13. An optical system as claimed in claim 1, wherein the randomizer is transmissive.

14. An optical system as claimed in claim 1, wherein the randomizer is reflective.

15. An optical system as claimed in claim 1, wherein the hollow element comprises a hollow sphere or a hollow tube.

16. An optical system as claimed in claim 1, further comprising a variable optical element or device in front of the randomizer for varying the light incident on the randomizer.

17. An optical system as claimed in claim 16, wherein the variable optical element or device is operable to vary at least one of the amplitude and phase of light.

18. An optical system as claimed in claim 16, wherein the variable optical element or device comprises at least one of a deformable mirror, a spatial light modulator, and a digital micro-mirror.

19. An optical system as claimed in claim 1, further comprising multiple detectors and means for diverting the speckle pattern to the multiple detectors.

20. An optical system as claimed in claim 19, wherein the means for diverting are operable to divert different parts of the speckle pattern to different detectors.

21. An optical system as claimed in claim 19, wherein the means for diverting comprise a controllable beam shaping device that includes one or more of a deformable mirror, spatial light modulator, and digital micro-mirror.

22. An optical system as claimed in claim 1, arranged as a wavelength meter or a spectrometer or interferometer.

23. An optical system as claimed in claim 1, further comprising multiple randomizers.

24. An optical system as claimed in claim 1, further comprising a laser, the system being adapted to monitor changes in the laser output by monitoring speckle patterns as a function of time.

25. An optical system as claimed in claim 1, wherein the randomizer comprises randomly positioned aluminium particles.

26. An optical system as claimed in claim 1, wherein the randomizer comprises a layer of film less than 50 μm thick.

* * * * *